M. A. Dietz.
Chimney Holder.
No. 802. Reissued Aug. 30, 1859
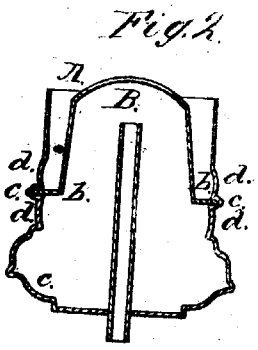
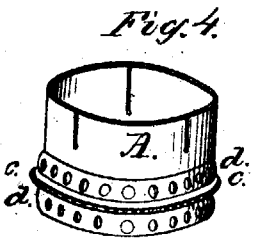
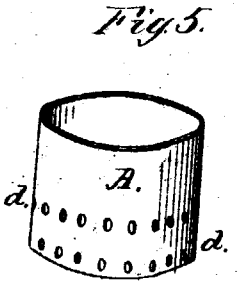
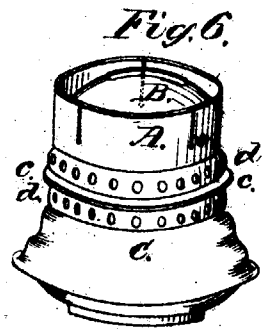
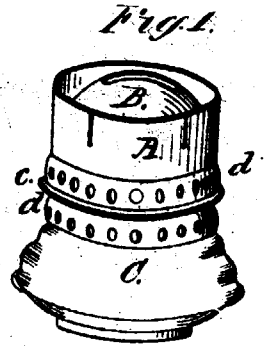
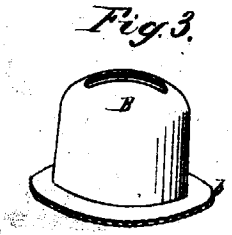
Witnesses.
Sa M. Dietz
Robert E. Dietz
Inventor:
Michael A. Dietz

UNITED STATES PATENT OFFICE.

MICHAEL A. DIETZ, OF BROOKLYN, NEW YORK.

IMPROVEMENT IN LAMPS.

Specification forming part of Letters Patent No. 23,832, dated May 3, 1859; Reissue No. 802, dated August 30, 1859.

*To all whom it may concern:*

Be it known that I, MICHAEL A. DIETZ, of Brooklyn, in the county of Kings and State of New York, have invented a certain new and useful Improvement in the Construction of Lamps for Burning Oil, Fluid, &c.; and I do hereby declare that the following is a full, clear, and exact description thereof, reference being had to the accompanying drawings, making part of this specification.

My improvement belongs to that class of lamps in which a cone or deflector and a chimney are used for the more thorough combustion of the oil, and relates more particularly to a new and improved mode of securing, attaching, or connecting the deflector to the chimney-band or chimney-supports. Heretofore the connection of these two parts with each other has been made with solder, which, as the lamps become highly heated by the action of the flame on the deflector, melts and allows the deflector to drop apart from the chimney-support.

To remedy this defect is the object of my improvement; and it consists in attaching or securing the two together by mechanical means, as contradistinguished from the use of solder, in such manner that the deflector will be retained in its proper relative position with regard to the wick-tube and chimney band or supports at any degree of heat short of the melting-point, to which end, however, three features are essential, first, a base or support to prevent the cone or deflector from dropping down inside of the chimney band; secondly, a frame or outside guard to prevent the cone or deflector from being moved laterally; and, lastly, one or more teeth or stops to engage with the deflector, or the requisite amount of friction, or other equivalent means, to prevent the deflector from turning around in the chimney band or supports.

To enable others skilled in the art to make, construct, and use my invention, I will now proceed to describe and ascertain the best means known to me of carrying it into effect, and of which there are several others, although all modifications of each other.

In the accompanying drawings, Figure 1 represents a view in perspective of a chimney-band and deflector as connected together on a plan to be now first described; Fig 2, a vertical section of the same. Fig. 3 represents a separate view of the deflector; Fig. 4, a separate view of the chimney-band; Fig. 5, a similar view before being connected with the deflector, and Fig. 6 a view of the lamp top with the groove turned in plain or smooth.

In this instance the chimney-band A and the deflector B are represented as being struck up separately in the usual manner by proper dies for that purpose, as shown in Figs. 3 and 4; and then the deflector B, whose under edge, *b*, is made to turn outward so as to form a flange, slipped within the band A to the required distance, and the two placed between rotating dies, which sink or depress the band A on each side of the flange *b* of the deflector, thus forming a groove, *c*, in the chimney-band, into which the deflector's edge *b* fits and by it the deflector is connected to the band A *b*; but as the deflector is liable to slip or turn around in the groove when the surface of the latter is smooth or even, the rollers or rotating dies may be so constructed as that on forming the groove they will at the same time mill or otherwise roughen its surface, as shown in Fig. 1.

Instead of forming the connection in the manner as above described, the groove may be formed at the same time that the chimney-band is struck up, and the deflector expanded in such groove by means of suitable dies; or instead of forming a continuous groove the dies or rolls may be so constructed as to strike up portions or sections of a groove only, or to form such other suitable depressions and projections as will support the deflector and prevent it from turning around in the chimney-band; or the same effect may be produced by means of a punch, either forming a depression from the inside of the flange of the deflector in the latter and the chimney-band, or from the outside of the chimney-band inward, but the former is preferable, in which case, however, the flange of the deflector must either be turned downward or upward and concentric with the chimney band; or the dies or roll may be so constructed as to strike up, but the lower side or half of the groove or sections of a groove so as to form the support for the deflector, and then a tooth or teeth be formed either on the deflector or chimney-band to engage with a corresponding indentation or indentations in the other to prevent the deflector from turning around or changing its proper relative position with regard to the wick-tube; or suitable curved or inclined projections or teeth may be formed on either to engage with suitable notches in the other to effect the same purposes. The preference to be given to any of the several modifications of my plan of connecting the deflector with the chimney band or supports will depend in a great measure upon the arrangement, shape, or design of the lamp-top; but when they are shaped and formed as represented in the accompanying drawings I prefer the manner first described and shown, as it is the easiest, simplest, and cheapest plan of forming the connection.

From the foregoing description it will be apparent that my improvement is susceptible of being carried into effect in various ways without departing in the least from the principle of the invention.

Having thus described my invention, what I claim as new, and desire to secure by Letters Patent, is—

Combining the deflector with the chimney-band by mechanical devices so as to retain the former in its proper relative position without the use of solder.

In testimony whereof I hereunto set my hand to this specification.

MICHAEL A. DIETZ.

Witnesses:
JAS. M. DIETZ,
ROBT. E. DIETZ.